United States Patent [19]
Brown et al.

[11] Patent Number: 6,147,686
[45] Date of Patent: *Nov. 14, 2000

[54] METHOD AND SYSTEM FOR REAL-TIME MANIPULATION OF MERCHANDISE LAYOUT AND DATA COLLECTION

[75] Inventors: Larry E. Brown, Palm Beach; Thomas Hugel, West Palm Beach, both of Fla.

[73] Assignee: Entrada Technologies, Ltd., West Palm Beach, Fla.

[*] Notice: This patent issued on a continued prosecution application filed under 37 CFR 1.53(d), and is subject to the twenty year patent term provisions of 35 U.S.C. 154(a)(2).

[21] Appl. No.: 09/028,583

[22] Filed: Feb. 24, 1998

[51] Int. Cl.[7] .................................................. G06F 3/00
[52] U.S. Cl. .......................... 345/349; 345/348; 345/355; 345/962; 705/28
[58] Field of Search ..................................... 345/326, 339, 345/348, 349, 355, 961, 962; 707/104; 705/27–29

[56] References Cited

U.S. PATENT DOCUMENTS

| | | | |
|---|---|---|---|
| 3,651,478 | 3/1972 | Shandlay | 705/28 |
| 5,848,399 | 12/1998 | Burke | 705/27 |
| 5,850,214 | 12/1998 | McNally et al. | 345/173 |
| 5,930,770 | 7/1999 | Edgar | 705/28 |

*Primary Examiner*—Raymond J. Bayerl
*Assistant Examiner*—Sy D. Luu
*Attorney, Agent, or Firm*—Jon A. Gibbons; Fleit, Kain, Gibbons, Gutman & Bongini P.L.

[57] ABSTRACT

A graphics data form includes an information processing system having a generator for generating graphics images, each image comprising a recognizable representation of at least one real-life object. The GDF also includes a selector for selecting an image by a user of the system; a receiver for receiving information from the user; an associator for associating the information received with the selected image; a real time processor for manipulating how the image is presented; and a real time processor for processing data associated with the selected image responsive to manipulation of the selected image.

23 Claims, 10 Drawing Sheets

FIG. 4A

Table 400:

| | A1 | A2 | A3 | A4 | A5 |
|---|---|---|---|---|---|
| CODE (407) | 1 | 4 | 28 | 6 | 18 |
| DESCRIPTION (409) | CAN | BOTTLE | 6 PACK | 12 PACK | CASE |
| UPC (411) | 12345 | X2346 | 12347 | 63348 | 94234 |
| FAMILY (413) | BRAND A | BRAND A | BRAND A | BRAND A | BRAND A |
| TYPE (415) | BEER | BEER | BEER | BEER | BEER |
| PRICE (417) | $1.99 | $1.99 | $3.99 | $6.99 | $8.99 |

Table 405:

| | B1 | B2 | B3 | B4 | B5 |
|---|---|---|---|---|---|
| CODE | 113 | 7 | 51 | 67 | 82 |
| DESCRIPTION | CAN | BOTTLE | 6 PACK | 12 PACK | CASE |
| UPC | 13345 | 12346 | 45347 | 18248 | 75349 |
| FAMILY | BRAND A LITE | BRAND A LITE | BRAND A LITE | BRAND A LITE | BRAND X |
| TYPE | BEER | BEER | BEER | BEER | SODA |
| PRICE | $3.99 | $2.99 | $4.99 | $4.99 | $3.99 |

|  | A1 | A2 | A3 | A4 | A5 |
|---|---|---|---|---|---|
| ASPECT | 18200\00011.1,1,1,1,1.0 | 18200\00834.1,2,1,1.7 | 18200\11401.1,1,3,2.3 | | |
| ROW | 1 | 1 | 2 | | |
| COL | 1 | 2 | 4 | | |
| CENTER POINT X | 122 | 299 | 627 | | |
| CENTER POINT Y | 214 | 230 | 520 | | |
| TOP | 126 | 159 | 453 | | |
| LEFT | 50 | 210 | 567 | | |
| HIGH | 226 | 193 | 185 | | |
| WIDE | 144 | 178 | 121 | | |

METHOD AND SYSTEM FOR REAL-TIME MANIPULATION OF MERCHANDISE LAYOUT AND DATA COLLECTION

CROSS-REFERENCE TO RELATED APPLICATIONS

Not Applicable

BACKGROUND OF THE INVENTION

1. Field of the Invention

This invention relates, in general, to the field of data collection and control and more particularly to a method and apparatus for graphically collecting and managing data using a graphics form.

2. Description of the Related Art

Collection of various types of data is a problem familiar to persons marketing or distributing products. Typically the delivery personnel assigned to distribution routes inspect inventory distributed across the various retail locations. During a stop at a specific retail location the delivery person often needs to accomplish several tasks. One task is the counting and tallying of goods at the retail location. A second task is the verification of prices on the inventory. Quite often, marketing promotions, promotional sales, product shelf life and other market conditions require the changing of pricing on the inventory at a retail location. For locations where there are many different package configurations -styles, sizes and containers -for a family of products the field inventory is even more difficult. It is easy for the delivery personnel to make inventory mistakes when tallying a variety of product families. It would be understandable, for example, to mistake inadvertently "family size" items on a shelf adjacent to "king size" items.

In the beverage industry, the number and styles of packing configurations can be large. For example, the Budweiser family of beers, produced by single producer Anheuser-Busch, is available in numerous packing configurations. Budweiser is generally available in different container types, i.e., both bottles and cans, available in different container sizes, e.g., 12 ounces, quarts, 32 ounces, 64 ounces, and available in different packaging groupings, i.e., six-packs, twelve-packs, twenty-four-packs or cases. Many times the price change effects only one of the packing types. Returning to the beer example, the price on twelve-packs may be reduced while the prices for other sizes remain the same. Therefore, the difficulty spent tallying and tracking pricing for a variety of packing styles can be great.

Another difficulty for delivery personnel is having to match the correct packing style with the corresponding numeric or symbolic codes. These numeric or symbolic codes are often printed on specific inventory forms, data sheets, spreadsheet formats or displayed on hand-held terminals with the product description listed adjacent to the inventory level in an abbreviated format. In the Budweiser example, the abbreviation might read "Bud 6 pack cans." Because the packing configurations are sometimes easily confused, even with the abbreviated description, the tallying of product data is conducive to errors.

Another difficulty for delivery personnel is the maximization of retail shelf space at specific retail locations. It is common for many retail locations to limit the available shelf space dedicated to the distributor's product. Often the delivery personnel needs to rearrange items in the defined area because of promotional sales or the introduction of new packing configurations. The delivery personnel will manually move inventory around on the shelves to accomplish the desired re-shelving without being certain that all the items will fit in a desired configuration. In the case of beer, if the defined area or more correctly the allotted space is a refrigerated display cabinet, the number of packing configurations, such as a six pack 12 ounce can configuration, that can fit on a shelf area may not be known without trial and error. This can be tedious and time-consuming and may not enable the distributor to maximize the use of shelf area.

Still, another difficulty arises when the distributors hire personnel to stock and inventory the items on a route. The time to train the personnel to be familiar with lists of products from a particular manufacturer, all the packing styles offered by the manufacturer, understanding the shelf rotation for product freshness, and the specific configurations at each retail location can be lengthy. In addition, the delivery personnel are usually required to record the current inventory levels for a variety of packing configurations. This creates the high likelihood of transcription errors when the delivery personnel is required to write down inventory information on a ledger or required to enter information with a hand-held electronic computer. Delivery personnel relying on lists of product packaging styles often lead to selection and input mistakes. As result, the time invested by distributor to train personnel can be great.

The costs for product data collection and management and inventory control can be great given the time spent, the associated cost of paying personnel to collect relevant data, and the difficulty with tracking many packing configurations for a given family of products. Therefore, there exists a need for a method and apparatus to provide a graphics data form.

SUMMARY OF THE INVENTION

Briefly, according to the invention, an information processing system comprises generating means for generating graphics images; means for selecting an image by a user of the system; means for receiving information from the user; associating means for associating the information received with the selected image; real time processing means for manipulating how the image is presented; and real time processing means for processing data associated with the selected image responsive to manipulation of the selected image. Each image comprises a recognizable representation of at least one real-life object.

BRIEF DESCRIPTION OF THE DRAWING(S)

Figure 4B:
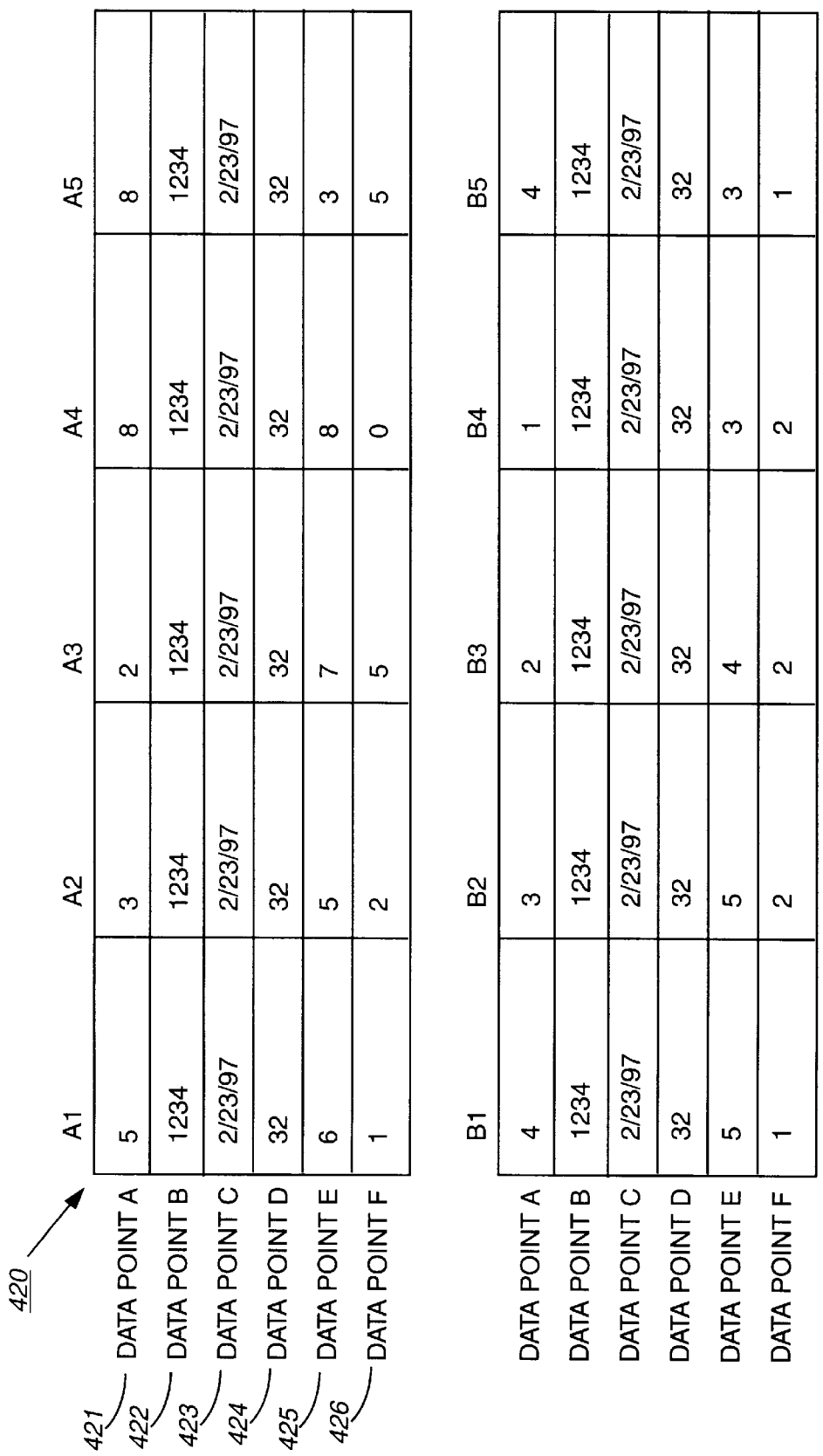

FIG. 4. Shows various data arrays according to the present invention.

Figure 5:
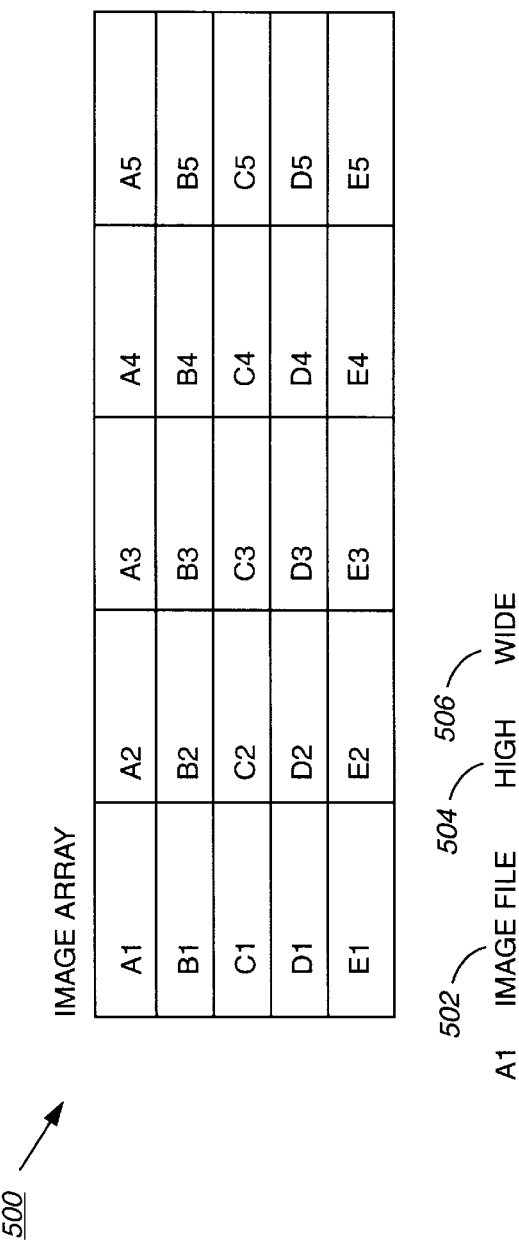

FIG. 5. shows an image array comprising data associated with product images.

Figure 6:
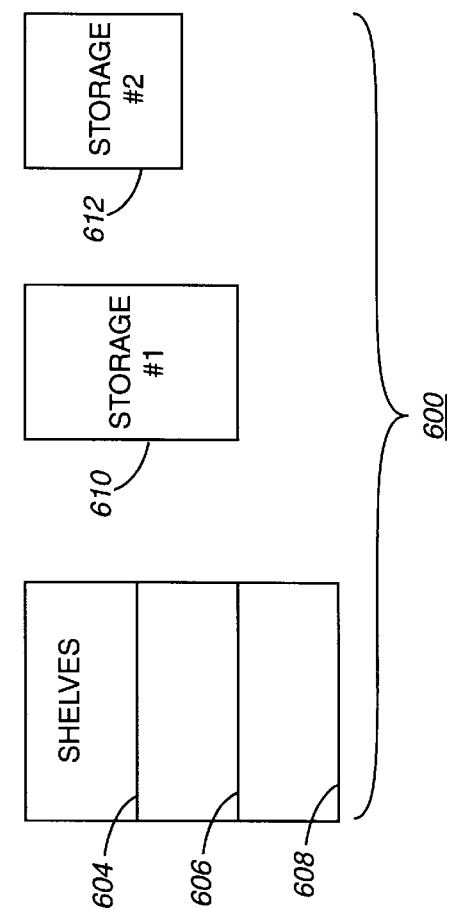

FIG. 6. Illustrates the concept of spatial definition for a graphics data form.

Figure 7:
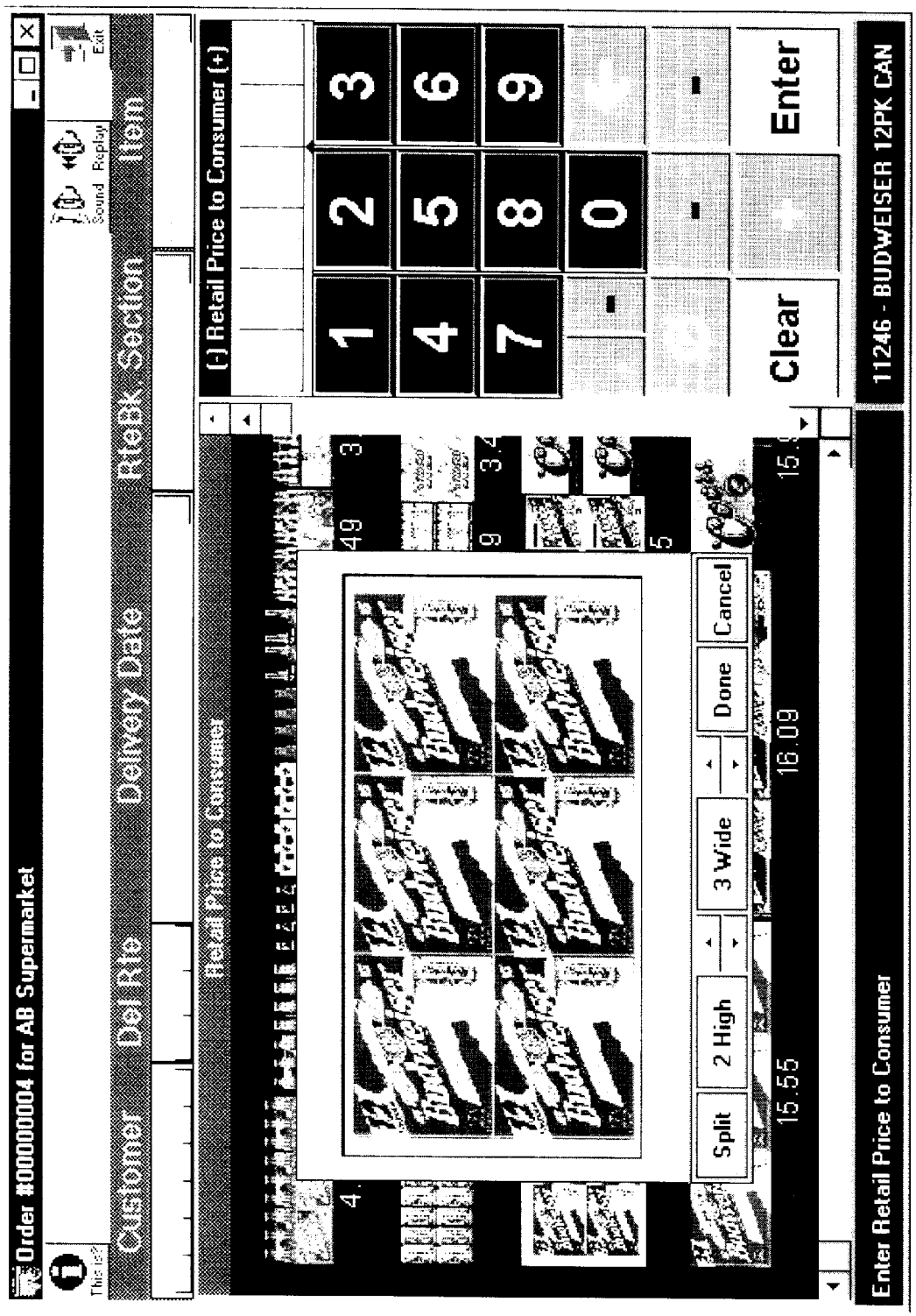

FIG. 7 is a screen illustrating another embodiment of a graphics data form using a sub-window.

Figure 8:
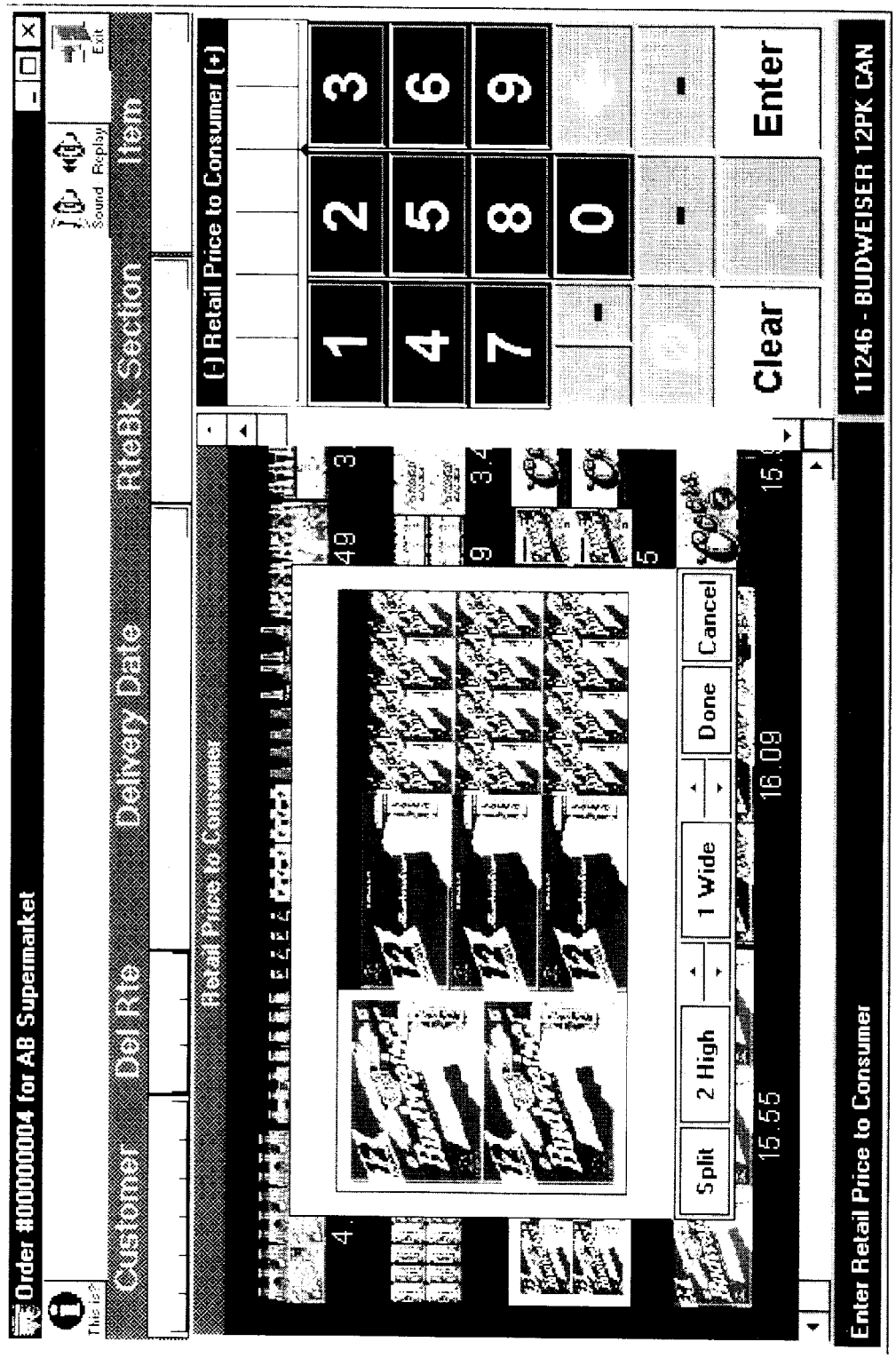

FIG. 8 is a screen illustrating another embodiment of a graphics data form using a sub-window illustrating a disparate product subgroup (2 high by 3 wide) of the graphical data form according to the present invention.

Figure 9:
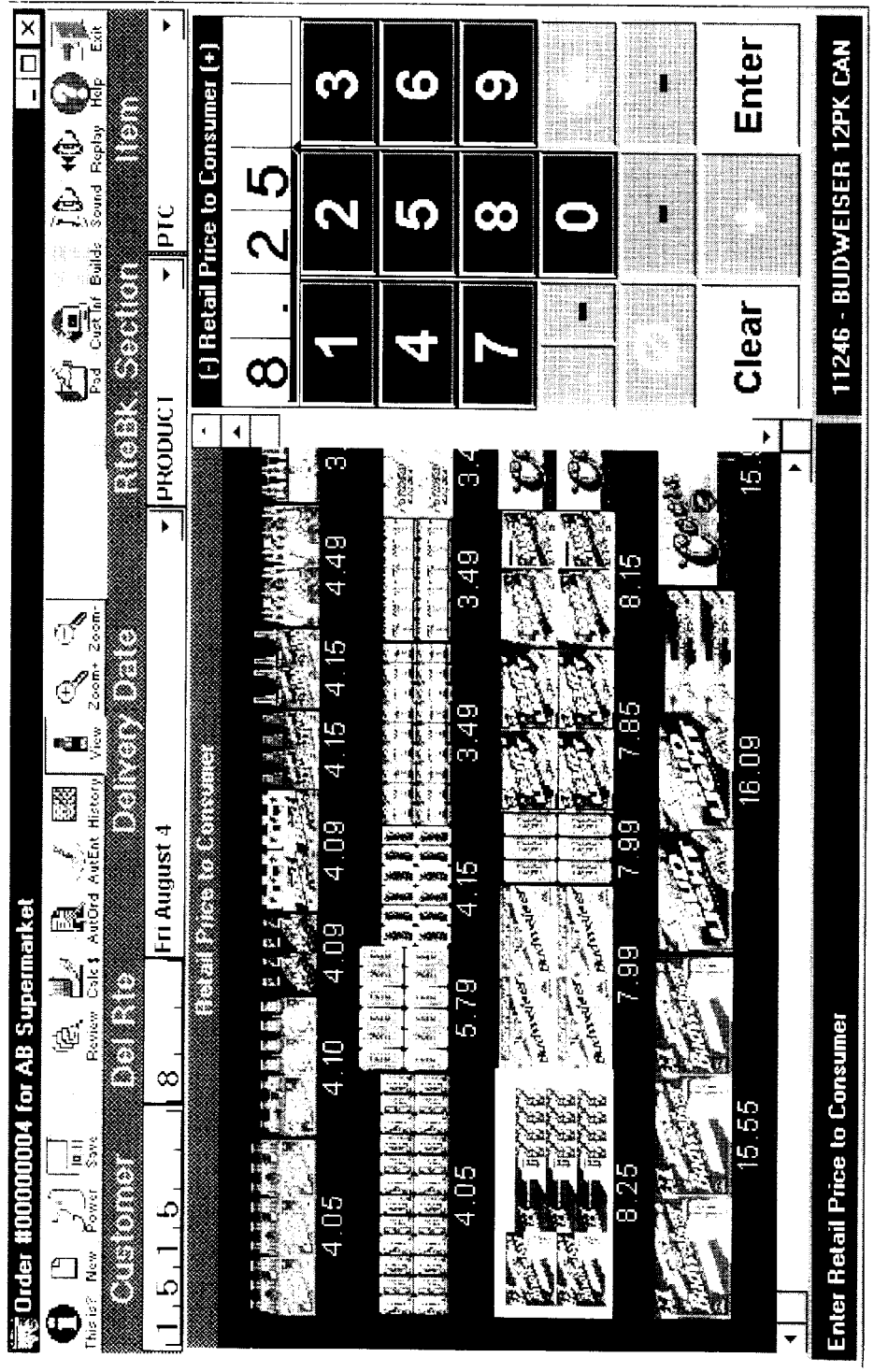

FIG. 9 is a screen illustrating the sub-window in FIG. 8 re-shelved back onto the graphical data form according to the present invention.

DETAILED DESCRIPTION OF AN ILLUSTRATIVE EMBODIMENT

Figure 1:
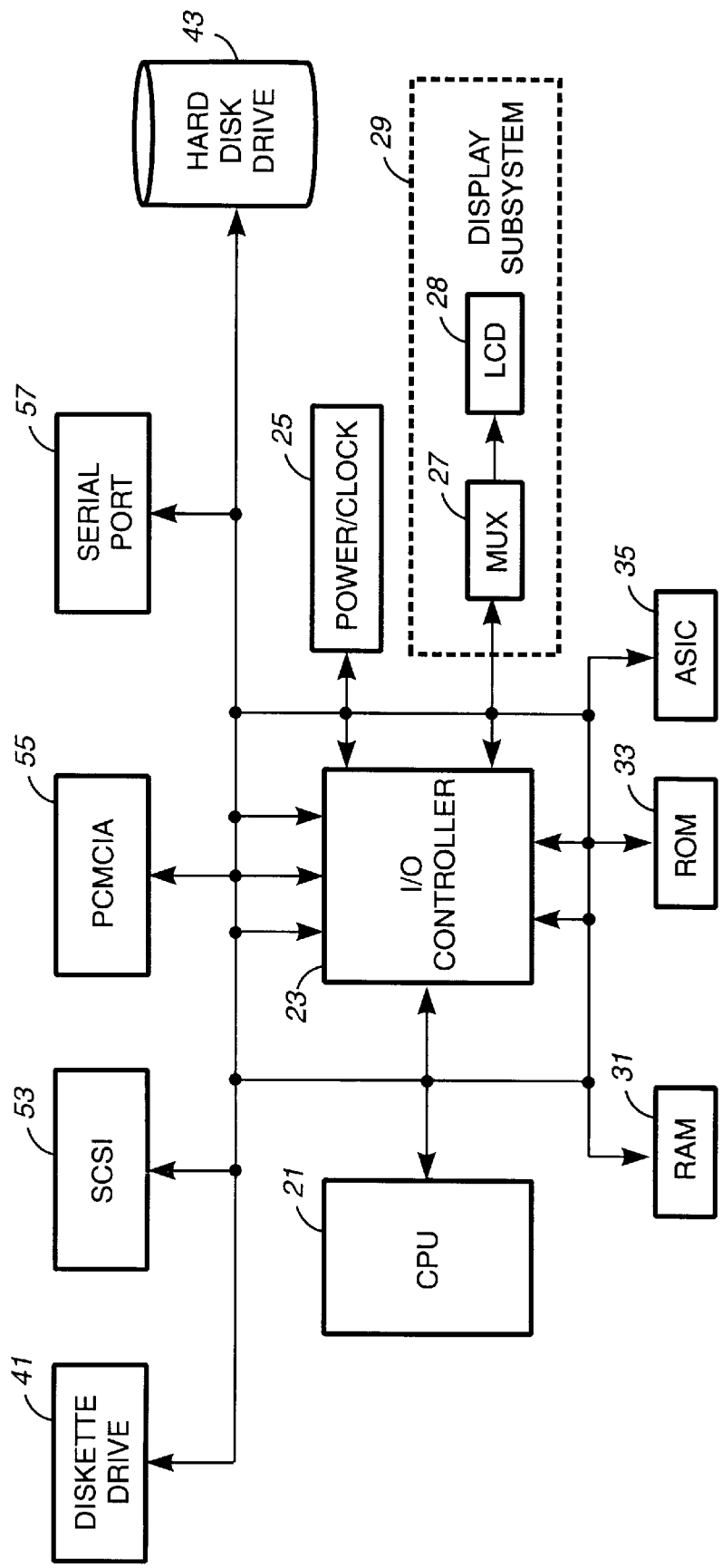
FIG. 1 is a block diagram of the major electrical components of a computer system used in accordance with this invention.

Referring to FIG. 1, there is shown a block diagram illustrating the major electrical components of a computer system 10 for use in accordance with this invention. When programmed and configured to perform as a graphics data form, the computer system 10 is used to collect and process data in a powerful and user-friendly manner. The electrical components include: a central processing unit (CPU) 21, an Input/Output (I/O) Controller 23, a system power and clock source 25; display subsystem 29 comprising a multiplexer (MUX) 27 and a liquid crystal display (LCD) 28; and a hard drive 43. Other components may include a RAM 31, ROM 33 and an ASIC 35 that can be specifically designed to operate in accordance with the invention. Equivalently, the ASIC 35 can be replaced by an application program (loaded into storage 43 or embedded in ROM 33). Optional components for interfacing to external peripherals or networks include: a Small Computer Systems Interface (SCSI) port 53; a PCMCIA slot 55; and a serial port 57 for attaching peripherals. An optional diskette drive 41 is shown for loading or saving code to removable diskettes. As is the case, in many data-processing products, the system 10 may be implemented as a combination of hardware and software components. Moreover, the functionality required for using the invention may be embodied in computer-readable media (such as 3.5 inch diskettes) to be used in programming an information-processing apparatus (e.g., a personal computer comprising the elements shown in FIG. 1) to perform in accordance with the invention.

Figure 2:
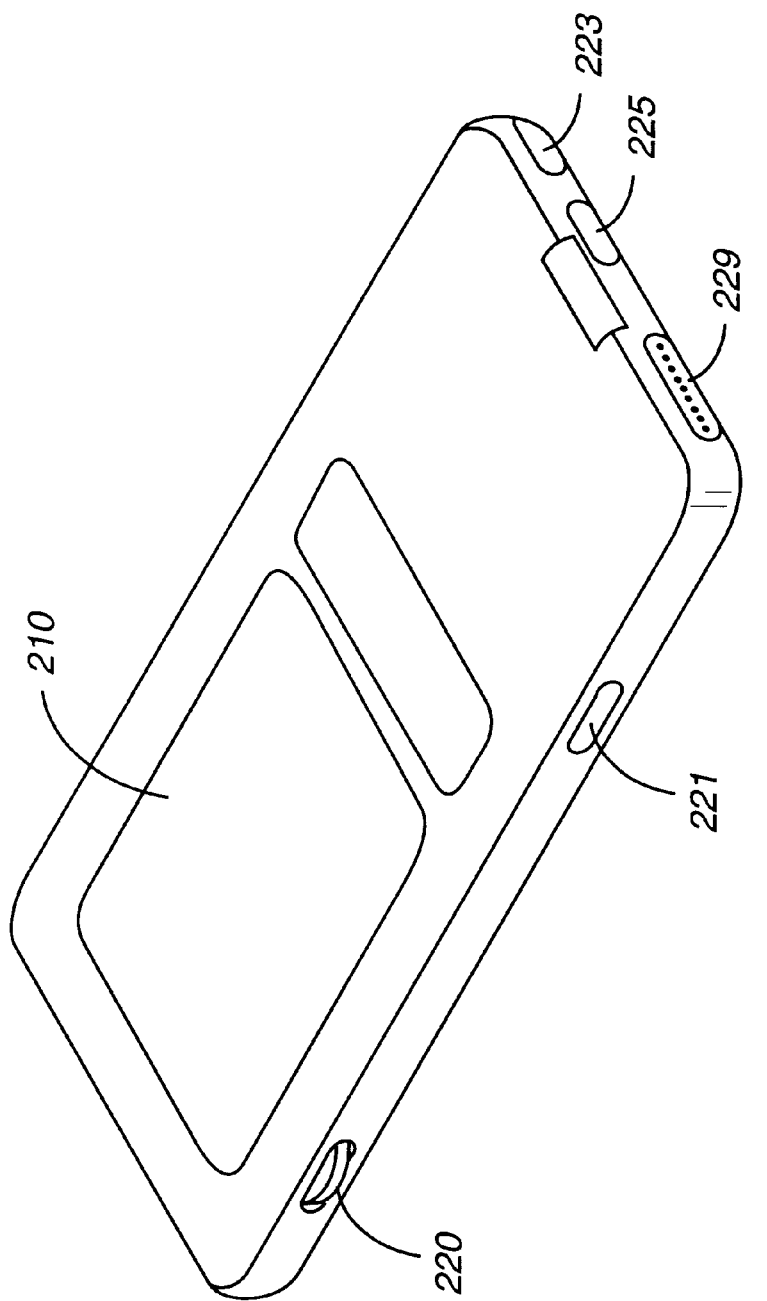
FIG. 2 is a perspective view of a tablet style computer including the components of FIG. 1.

FIG. 2 is a perspective view of a tablet style computer 200 including some or all of the components of FIG. 1. The portability of such computers makes them ideally suited for implementations of the present invention. The tablet computer 200 comprises a display 210, a brightness adjuster 220, an On/Off switch 221, an audio speaker 223, a serial interface 225 such as a 9-pin connector, and a PCMCIA slot 229. The display may be monochrome or color, and a pointing device (not shown) such as pen, mouse, track point or a touch screen that is suitable for cursor manipulation may be used.

The tablet style computer 200 can run any commercially available operating system such as DOS, Windows 3.1, Windows CE, Windows 95 or other suitable operating system. The operating system used can include support for a database, such as Oracle DB/2, Microsoft Excel, Lotus Approach, Corel Paradox or other formats that can support typical data collection application such as those in product or inventory related fields (e.g., item, quantity, costs, stock, shelf life, delivery route, delivery truck, delivery date, delivery location.) The system can be particularly useful for entering data that does not continuously change, such as the location of a particular product in supermarket shelves. The present invention can be advantageously implemented as an application program for a portable computer system. Such an application program can be written using a variety of programming languages including Visual Basic, C/C++, assembler or any other commercially-available programming tools.

Figure 3:
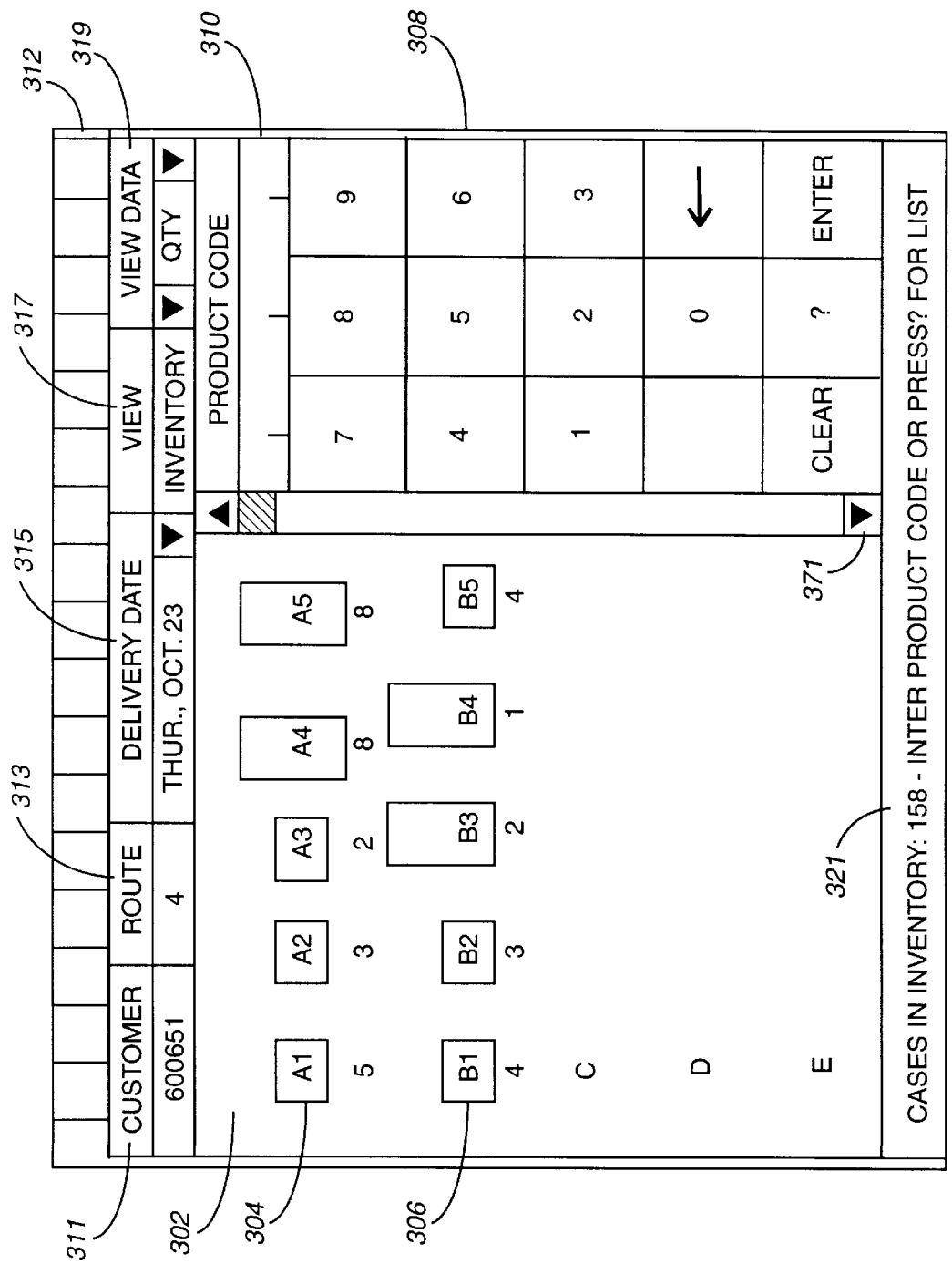
FIG. 3 is a representative screen displaying a graphics data form according to the present invention.

FIG. 3 shows a screen including a representative graphical user interface (GUI) 300 comprising a graphics data form (GDF) according to the present invention. The GDF can be implemented as an object for use in an application program (e.g., a Windows application). It is applicable to any system wherein a user needs to collect and/or process data relating to real-life subjects (or items). In accordance with the invention, the GDF object allows the user to collect or process the data in real-time by means of manipulating certain pictures or images appearing on the screen 300.

Consider as an example, an object (called a VirtualCooler) representing a common supermarket cooler for storing various packages of beer products. The VirtualCooler includes a portion 302 that represents a typical supermarket cooler for displaying beer products for sale. For purposes of illustration, assume that items A1–A5 and B1–B5 represent various packages for the beer products. Virtual products (i.e., representations of real life objects such as beer packages) A1–A5 are arranged on a virtual shelf 304 and B1–B5 are shown arranged on a virtual shelf 306 in a virtual cooler display 302. These products can be cans, bottles, cases, or other products typically displayed or stored on shelves. A user selects any image by pointing and clicking or other means. The selected image can then be manipulated by dragging and dropping it next to or on top of another. These manipulations affect the data associated with the selected image. Moreover, a user can use any of various means for entering or modifying data on the selected image.

The kind of data entered could be any product attributes, such as price, quantity in stock, size of package, market location. These data can be broken down to logistic data (e.g., orders, replenishment or accounting) and non-logistical (all information that is not logistic).

The data collected and processed using the GDF can be stored in storage within the host system (an internal data structure) or remote from the host (an external data structure such as a central mass storage device). Thus in the case of the pen driven system 200 the data could be stored in the system hard disk or it could be transmitted (e.g., by modem) to a remote storage system such as a server.

The screen 300 comprises various means for data entry or processing by a user. These include a keypad 308 and associated alphanumeric character display 310. The screen 300 also includes typical windows buttons 312; a CUSTOMER field display 311 for identifying the customer with a number entered below; a ROUTE field display 313 for identifying the route; a DELIVERY DATE pull down list box 315 for entering and showing the delivery date; a VIEW pull down list box 317 for selecting and displaying the data category; and a VIEW DATA pull down list box 319 for selecting and showing data related to the data category shown under VIEW.

Accordingly, when a user selects an image (e.g., A3), by touching the screen over the image A3 or pointing at it with a pen, the system associates the real life item represented by that image with the data associated with that image A3. Each row represents a product shelf at the retail location. The top-most shelf, depicted as row 304, contains lifelike graphical image representations or "virtual products" of various product beer packing configurations A1, A2, A3, A4, A5. In this example, the images on row 304 each represent a type of package of Brand A Beer. A1 is the graphical image representation for a 6 pack of 8 ounce "nips" bottles. A2 is the graphical image representation for a packing style for a six pack of 12 ounce bottles. A3 is the graphical image representation for a 6 pack of 12 ounce cans. A4 is the graphical image representation for a 12 pack of 12 ounce cans. Images along row 306 are graphical image representations of Brand A Beer Light Products in different packing styles B1, B2, B3, B4, B5. The images along row 304 represent different package styles of Brand A Ice Beer Products. The subsequent rows C–E represent additional virtual shelves for holding additional virtual products. As mentioned above, a great advantage of the invention is the ability to collect or process data in a real time fashion by image manipulation. This is made possible by the following functionality.

MANIPULATION OF GRAPHICS IN REAL TIME

In order to maximize the speed of the system, the images representing product packages are reproduced to scale. Commonly, images (e.g., Windows or Macintosh icons) displayed on computer screens are not produced to scale, meaning that two packages that are in real life the same size can be (and often are) different sizes in image data. In accordance with one aspect of the invention, conventional images are scaled to represent the real life subjects they represent. For example, the images can be stored on a diskette, which is loaded into the memory of the pen computer 200 for display to a user. For purposes of illustration, the memory of the computer can be divided into three different locations in order to run the VirtualCooler system. One portion of the computer's memory is called the Temporary Image Holder. This portion of the memory provides temporary storage of image data which is obtained from an outside storage medium (e.g., a diskette). Another portion of the computer's memory is devoted to the storage of product and aspect data (which will be defined below). Still another portion of the memory of the computer is devoted to the display of the images in the VirtualCooler Image Holder. The VirtualCooler program determines which images are to be displayed by looking at both product and aspect data. Product data represents various data points, or categories of data. The quantity stored with respect to a data point is called a value. Each data point is in turn linked to an image. It is important to note that alternate views of the same product (such as a top or side view) are different images, and as such have different links in the product and different aspect data. The process of linking images to be displayed to a given piece of data is an example of what makes VirtualCooler a data-driven program.

In addition to determining which image to display, VirtualCooler must also determine the location in which to display the image. This is because the images that appear in the visual display are in fact multiple images (e.g., each beer package) placed upon a given image (e.g., that of a shelf, as opposed to one complete image (picture). The location in which each image is to be displayed is contained in the aspect data. Therefore, the product data determines the image to be displayed, while the aspect data determines the location of the image. Once the image and its location have been determined, the computer transfers the image into the Temporary Image Holder, and merges the image into the VirtualCooler Image Holder. This process is repeated multiple times in order to compose each visual display that appears on screen.

SCROLLING

Two different items enable the user to move about the visual display that appears on screen in the VirtualCooler. Both the cut and paste feature and the information contained in the aspect data enable the user to move around the visual displays contained in VirtualCooler in a virtually seamless manner by moving the images in a real time format.

In order to understand how this is accomplished, it is helpful to understand the "image within an image" concept used in the GDF discussed above. In very simple terms, each product image that appears on screen is an image within an image, with its own designated location in the larger image (in this case, the shelf. In addition, the larger image (the shelf or shelves) is in fact an image which is larger than the one appearing on screen. Just like the smaller images, the larger image has location coordinates that correspond to the size of the screen. Thus, the image that appears on screen is in fact a portion of a large image (the shelf) that contains several smaller images (the products). The program code contained in the VirtualCooler system indicates what portion of the larger image is to be displayed on screen, which in turn dictates the smaller images to be displayed. When scrolling through the display, the user is changing the location coordinates to be displayed. The program responds to this by changing the display, using the newly selected coordinates.

The new image is then displayed in a real time format, thus allowing the user to view the new image almost instantly. This is accomplished through two operations, each of which occurs almost instantly. First, the portion of the old display that is repeated in the new display is moved to its new location through the use of a "cut & paste" feature of the system. Second, the new portion of the image is then determined by the location coordinates imbedded in the program, and is displayed accordingly. By combining both operations, VirtualCooler is able to display a different visual image in a real time format. For example, a user can select an image, drag it to another position next to or on top of another image and that information is automatically captured by the system.

MANIPULATION OF IMAGES

Another important feature of the VirtualCooler system is the ability to manipulate a display by stacking images of products on top of one another or placing images of additional products in a display side by side. In response to this image manipulation, the data associated with the manipulated image changes. This is also accomplished in a real time format. Once again, the key to the ability of the VirtualCooler system to perform this operation in a real time format is the "image on image" concept. Manipulation of images is accomplished by repeated display of a given image. In order to create a display representing a 2×2 arrangement of packages, the program simply repeats the display in multiple locations, which are then placed next to one another. The images are then placed back into the larger image (the shelf), and the remaining objects are moved in order to allow the new image to be displayed. Displays that use alternate views of a product operate in much the same way. Each alternate view is a separate image, with its own aspect data. By linking the images together, the user dictates the location of the new image, just as if it were a repeated image. The manipulated image is then placed back into the display, and other images are moved to make room. In summary, because the screen display is not a static image, but in fact several small images on top of a larger image, only the smaller image is manipulated, thus allowing for increased speed.

PRODUCT INTERACTION

The VirtualCooler system also allows the user to interact with the images displayed in the visual display. Because the system is data driven, this interaction not only allows the user to interact with the image, but also with the data connected to it. This is accomplished through the selection of images within the visual display. In order to select an image to work with, the user may point to a location on the screen. The VirtualCooler system then determines which product has been selected by the user using various mathematical equations to determine the image nearest the point selected by the user. Once an image has been selected, the user is able to input data regarding that image into the system. Because the system is data driven, a user may also select a given image by entering a numeric link into the system. The VirtualCooler system receives the data entered by the user, analyzes it, and selects the product associated with the code entered by the user.

It should also be noted, that the graphical representation for each product configuration is lifelike in appearance, thus making it easy to match real product configurations at a retail location with those within the VirtualCooler. Stated differently, the virtual products placed along locations on the different rows, create the visual impression of a virtual cooler where virtual products are arranged on a virtual shelf. Thus, the items resemble a real life arrangement of beer packages on a cooler. Typically the real-life virtual package is a bitmap image created from a photograph of the desired product in the desired packing configuration in a well know manner. Any lifelike image for a new product can be edited, deleted and added to accommodate changes in product packaging and configurations for retail outlets at a later time.

Suppose the user wants to add a new package style for a specific retail location. A new virtual package for the desired style is loaded through an external interface, such as a SCSI port 53, PCMCIA slot 55, serial port 57, or diskette drive 41, connected with an external source such as disk, diskette, network, CD or any other computer readable medium. Once the virtual package is loaded locally, the association with a data storage location is made for the inventory fields including the item quantity, cost, price, shelf life, route, store, and other typical inventory related data. The association to the data storage location is important because each virtual package at a particular retail location on a particular route must be associated with the corresponding product data entries. This association ensures that as the virtual package is moved within the 2-dimensional space shown in the screen to a different location on a shelf or even to a different shelf, the exact association between the virtual package and the corresponding item in the inventory data base is maintained.

FIG. 4 shows a set of data arrays (400, 420, and 450) used for possible implementation of the present invention. In these arrays the number of rows and the number of columns for each of these four data arrays are related. Each array comprises a set of columns, each corresponding a product or image representing the product. These Arrays are all internal data structures.

Product Array 400 comprises product data array elements. Global product information is product data that does not change from instance to instance (e.g., from store to store). This includes, for example, data on pricing, description, and Universal Price Codes (UPCs). In this example, the Product Array 400 comprises a set of rows, each containing data relating to a description or attribute of a product. Each column represents one product and six product data attributes 405 (one for each row). The product attributes comprise Product Code 407, Description 409, UPC 411, Family 413, Type 415 and Price 417. Code 407 is an unique identifier for each product contained in a product list. Description 409 is a packing unit description, in this beverage example, this identifier is typically a can or bottle. UPC 411 is the retail bar code number. Type 415 is the retail family brand, e.g., Brand A for a beer family of products (e.g. Budweiser), Brand B for a light beer family of products (e.g., Budweiser Light) and Brand X for a family of soft drinks. Price 417 is the retail price for the product. These product array data elements 405 are representative of a beverage product example but the elements can easily be modified and expanded to handle other types of products such as snack foods, magazines and periodicals or any other such item. This is data that could be specific to a particular customer such as a Publix supermarket that sells the subject products.

Product Value Array 420 comprises a set of rows, each containing data relating to a datapoint. Each column represents one product and six datapoints. In this example, the Product Value datapoints are Data Point A 421—Data Point F 426. A datapoint could be any product attribute, such as price, quantity in stock, size of package, market location. A datapoint can be broken down to logistic data (e.g., orders, replenishment or accounting) and non-logistical (all information that is not logistic).

Product aspect array 450 comprises columns A1–A5 representing the beer products of this example. Product aspect data is data required to display the graphics representation text information. It is used to create images such as those shown in the screen 300. The row labeled "Aspect" contains a comma-delineated string which contains aspect information relating to the location of the image representing the subject product.

The first set of data (here 18200\0001 1.1) represent the image file for the product (which is made up of the product's full UPC number), next two numbers (1,1) represent the number of times the image is repeated in the display (high & wide). The last number represents the product's sectional definition for use in the spatial definition of the Virtual-Cooler. This number is used to create space between products in the VirtualCooler.

Rows 2 and 3 ("Row" and "Col") indicate the relative positioning in which an image is to be displayed. Thus, image A1 is located on col. 1 and row. 1 (see FIG. 3). The precise position of the image is a function of the size of the product image to the left of the product image being displayed, the size of the product images above the product image being displayed, and any spatial definition given to the data point.

The next two rows (Center Point X and Y) indicate the center points of the image relative to the larger display image file.

The rows labeled "Top" and "Left" indicate the starting point from which the product image will be placed into the visual display. These indicate a displacement from a starting point, representing the image.

The last two rows ("High" and "Wide") indicate the height and width of the total product image, which varies according to the number of images repeated for a given product display. The units used in rows 4–9 are image units. Depending on the scale chosen (e.g., 12 image units per inch), the size of the real life object represented can be determined. The image units shown in rows 6–9 represent displacements relative to reference (Center) points rather than absolute locations. Array 450 works in conjunction with arrays 400 and 420.

Thus, Product Aspect Array 450 comprises information needed for the association between the lifelike graphical images and the instance of product data located in the Product Value Array 420 and the product attributes located in the Product Value Array 420.

FIG. 5 shows an image array comprising the images associated with the products of the other arrays. This image array 500 is useful for improving the speed of manipulating the images because the data stored therein can be easily manipulated without having to re-create a bitmap representing the screen display. Thus, below the array 500 is shown a comma-delineated string of data for image A1. The Image-File 502 identifies the name of the image file located in a memory storage device. The High 504 and Wide 506 elements indicate, respectively, the height and width of the subject image (A1).

Therefore, referring back to FIG. 4, in the Product Aspect Array 450, the row named Aspect contains the comma delimited string (18200\00011.1,1,1,1.0) where 18200\00011.1 is the name of the image file located in the Image Array 500. The next element in the Aspect row is the number of times the image is repeated high. The final element in the comma delimited Aspect row is information needed if a spacial definition (discussed below) is applicable to the selected data point. This data is used to determine the section (1) this product is located in along with blank spacing (0.0) that could precede the image of the product.

In the preferred embodiment, the present invention enables the user to select between different views of data. Referring again to FIG. 3, there is shown a product value view where the value of each virtual product is displayed underneath it. For the top most row 304 a value is shown for each virtual product. These values represent the number of the associated package actually in the cooler. Other values can be shown in this manner (as selected by the user).

To manipulate the virtual products (i.e., the images), the user simply "drags and drops" the virtual products to the desired location on the virtual self. All the stored product information is associated with the virtual product image. The number of virtual products that can fit on a shelf can be increased or decreased by changing the width of each shelf (i.e., width of the row). The number of rows can be increased or decreased and be scrolled vertically by elevator bar 371.

The virtual product images can be any picture readily recognized by an average person as being associated with the real-life item to which it corresponds. However, in the preferred embodiment, the images are actually digitized pictures of the products they represent. It is also preferred that the images on the display are a scaled representation of the product represented. For example, if the product represented is a six pack of beer, it is important that the image is a scaled representation because that allows a user to determine the number of products that fit within a cooler or display shelf in which the product is to be arranged. These advantages can be realized by either having pictures of the real-life product or easily recognizable images. An advantage associated with use of accurate pictures is that the user can even identify the brand of the beer from the picture.

Another important aspect of the invention is the type of data that can be stored and processed via the graphics images. These data types include product attributes (any data related to the product), logistics data (e.g., orders, replenishment data, accounting data, and transactional data), and non-logistical data (product information that is not logistical, i.e. price to consumer).

Referring to FIG. 6 there is shown an illustration of the spatial definition concept 600. To further enhance the appearance and usability of the GDF, the system includes the capability to create a "Spatial Definition" at the datapoint level. Examples of a "Spatial Definition" include, but are not limited to: the physical dimensions of a back room storage area; the physical dimensions of a beer or soft drink cooler or shelf; and/or the physical dimensions of a retailer's store, floor space, etc.

The creation of a "Spatial Definition" for a datapoint within the VirtualCooler system entails the collection of information not only on the size of a given space, but also information about the space, such as "traffic flow." The VirtualCooler program categorizes space in different manners (shelf space, storeroom space, display space, etc.) In building a "Spatial Definition" into the VirtualCooler program, each individual area is considered to be a separate space. It is important to note that as with the other data collection features of the program, there can be multiple classifications of space. The manner in which space is classified also effects the way in which it is displayed in the VirtualCooler. For example, a shelf may appear with only a bottom border, while a cooler may contain the effect of a see-through door (meaning that a handle may appear on screen).

In FIG. 6, there is shown a store with a cabinet 602 having three (3) shelves, 604, 606, and 608 and two (2) storeroom inventory areas 610 and 612. Each of the shelves as well as the two storeroom locations are considered a separate "space", providing a total of five spaces. The display of each space would vary according to category (meaning that storeroom space would look different from shelf space).

Once the number and category of each space has been determined, the building of a spatial definition becomes a matter of gathering data regarding the actual size of each space (height, width, depth). This information is then placed into the system, and a scaled visual display on the Graphics Data Form results.

It is also important to note that while the area of space remains constant (unless the "Spatial Definition" is changed) the data pertaining to the products located within the defined space can and will change. This means that while the length of a shelf will remain constant, the number of products on the shelf as well as the product s aspect, or view may change. In addition, the data associated with the product can and will change according to the data point selected by the user, (i.e., three cases on Friday's inventory, one on Monday's inventory). Although there are certain advantages in using a spatial definition it is also possible to implement a GDF without using one. Such an implementation has the advantage that there is greater flexibility for the user to store virtual products in virtual storage because without the use of spatial definition the storage space is boundless.

Referring now to FIG. 7, a representative graphics user interface illustrating another embodiment of the graphical data form according to the present invention. The virtual product A2 is selected with a mouse or pointer and a stacking window 702 is displayed. The window 702 comprises a close up or exploded view of the virtual product A2 and a set of graphic command buttons 704 for manipulating the image arrangement. The stacking window 702 allows the user to stack packages in a given sub-window to explore other stacking arrangements on a shelf. The user can select the number of virtual products to place in the subgroup vertically (i.e., high) and the number of packages to place horizontally (i.e. wide).

In FIG. 8 the example illustrates a two high by three wide (i.e., 2×3) arrangement of virtual products. The user can simply choose the "Done" button on the window and the subgroup arrangement is displayed on the shelf. The subgroup can contain packaging styles from two or more packaging configurations. Depicted is a subgroup consisting of three distinct packaging configurations, all stacked two high and one wide (i.e., 2×1) to create a subgroup of six packages.

FIG. 9 illustrates the subgroup in FIG. 8 re-shelved back onto the graphical data form according to the present invention. The association between each image of the virtual packages in subgroup of FIG. 8 is maintained by appending additional bitmap or image file information to the specific row-column image data element of image array 500 in FIG. 5. For example, the second virtual package in subgroup A2 is stored in image data element A2 along with a second bitmap's corresponding graphical characteristics of how high and how wide is the image. Thus, the data stored in the system relating to product arrangement can be modified by moving virtual product images to match the actual arrangement of the real-life products in the supermarket shelf. Using the GDF this is done quickly by keeping track in a memory of the location of bitmaps for each virtual product image and modifying that information responsive to the arrangement (e.g., stacking one image on another).

While the invention has been illustrated and described in the preferred embodiments, many modifications and changes therein may be affected by those skilled in the art. The invention is generally useful for data collection processes. It is to be understood that the invention is not limited to the precise construction disclosed herein and that the scope of the invention is defined only by the claims appended hereto and equivalents. Accordingly, the right is reserved to all changes and modifications coming within the true spirit and scope of the invention.

What is claimed is:

1. An information processing system comprising:
    at least one graphics form comprising at least a two dimnensional scaled spatial definition of one or more real-life shelves to hold one or more real-life objects;
    a data structure with one or more fields for holding information of the one or more real-life objects including: an image of a recognizable real-life object to be displayed; a real-life object scaled spatial definition; and a location to display the image on the one or more real-life shelves of the graphics form;
    generating means for generating graphics images on the graphics form, each image generated based upon the information in the one or more fields of the data structure;
    means for selecting an image by a user of the system;
    means for receiving information from the user, including information related to how the image of the one or more real-life objects is presented on the one or more real-life shelves of the graphics form; and
    associating means for associating the information received with the data structure used to generate the selected image so that any change in arrangement of the one or more real-life objects on the one or more real-life shelves is reflected in the data structure to subsequently present the one or more real-life objects on the one or more real-life shelves based on the information received from the user.

2. The information processing system of claim 1 wherein the information includes the number of times the image for a given real-life object is to be repeated along at least one spatial dimension at a location on the graphics form, so as to represent an arrangement of a collection of one type of real-life objects at a location on the graphics form.

3. The information processing system of claim 2 wherein the number of times the image is repeated is given in height and width so as to represent a stacked collection of real-life objects.

4. The information processing system of claim 1 wherein the image of a recognizable real-life object is a digitized picture of the real-life object.

5. The information processing system of claim 1, wherein the selection means includes means for selecting among a plurality of viewing angles of the graphical representation of the real life object.

6. The information processing system of claim 1, wherein the graphics data form represents refrigerated retail shelf space.

7. The information processing system of claim 6 wherein the graphics form further includes a door with a see through portion for viewing the images of the real-life objects therethrough.

8. The information processing system of claim 1 wherein the graphics data form represents non-refrigerated retail shelf space.

9. The information processing system of claim 1, wherein the Graphics date form represents storage space.

10. The information processing system of claim 1 wherein the information received comprises information relating to attributes of products.

11. The information processing system of claim 10, wherein the information received comprises business attributes of products.

12. The information processing system of claim 11, wherein the information received comprises logistical business attributes of products.

13. The information processing system of claim 11, wherein the information received comprises non-logistical business attributes of products.

14. A method for collecting information relating to an object represented by an image, comprising the steps of:
    generating at least one graphics form comprising at least a two dimensional scaled spatial definition of one or more real-life shelves to hold one or more real-life objects;
    defining a data structure with one or more fields for holding information of the one or more real-life objects including: an image of a recognizable real-life object to be displayed; a real-life object scaled spatial definition; and a location to display the image on the one or more real-life shelves of the graphics form;
    generating graphics images on the graphics form, each image generated based upon the information in the one or more fields of the data structure;
    receiving a selection of an image by a user of the method;
    receiving information from the user, including information related to how the image of the one or more real-life objects is presented on the one or more real-life shelves of the graphics form; and
    associating the information received with the data structure used to generate the selected image so that any change in arrangement of the one or more real-life objects on the one or more real-life shelves is reflected in the data structure to subsequently present the one or more real-life objects on the one or more real-life shelves based upon in ion received from the user.

15. The method of claim 14 wherein the step of defining a data structure includes defining a data structure for holding information that includes the number of times the image for a given real-life object is to be repeated along at least one spatial dimension at a location on the graphics form, so as to represent an arrangement of a collection of one type of real-life objects at a location on the graphics form.

16. The method of claim 15 wherein the step of defining a data structure includes defining a data structure where the number of times the image is repeated is given in height and width so as to represent a stacked collection of real-life objects.

17. The method of claim 14 wherein the step of defining a data structure includes defining a data structure with one or more fields for holding information of at least one real-life object including an image of a recognizable real-life object that is a digitized picture of the real-life object.

18. The method of claim 14 wherein the step of generating a graphics data form includes generating a graphics data form representing refrigerated retail shelf space.

19. The method for collecting information as defined in claim 14 wherein the step of generating a graphics data form includes generating a graphics data form includes graphics data form representing non-refrigerated retail shelf space.

20. A computer-readable medium including program instructions for:

generating at least one graphics form comprising at least a two dimensional scaled spatial definition of one or more real-life shelves to hold one or more real-life objects;

defining a data structure with one or more fields for holding information of at least one real-life object including: an image of a recognizable real-life object to be displayed; a scaled real-life object spatial definition; and a location to display the image on the graphics form;

generating graphics images on the graphics form, each image generated based upon the information in the one or more fields of the data structure;

receiving a selection of an image by a user of the method;

receiving information from the user, including information related to how the image of the one or more real-life objects is presented on the one or more real-life shelves of the graphics form; and associating the information received with the data structure used to generate the selected image so that any change in arrangement of the one or more real-life objects on the one or more real-life shelves is reflected in the data structure to subsequently present the one or more real-life objects on the one or more real-life shelves based upon the information received from the user.

21. The computer-readable medium of claim 20 wherein the programming instruction of defining a data structure includes defining(, a data structure for holding information that includes the number of times the image for a given real-life object is to be repeated along at least one spatial dimension at a location on the graphics form, so as to represent an arrangement of a collection of one type of real-life objects at a location on the graphics form.

22. The computer-readable storage medium of claim 20 wherein the programing instruction of defining a data structure includes defining a data structure for holding information that includes the number of times the image for a given real-life object is to be repeated along, at least one spatial dimension at a location on the (graphics form, so as to represent an arrangement of a collection of one type of real-life objects at a location on the -graphics form.

23. The computer-readable storage medium of claim 22 wherein the programming instruction of defining a data structure includes defining a data structure where the number of times the image is repeated is given in height and width so as to represent a stacked collection of real-life objects.

* * * * *

UNITED STATES PATENT AND TRADEMARK OFFICE
CERTIFICATE OF CORRECTION

PATENT NO.    : 6,147,686
DATED         : November 14, 2000
INVENTOR(S)   : Larry Brown et al.

Page 1 of 1

It is certified that error appears in the above-identified patent and that said Letters Patent is hereby corrected as shown below:

Column 9,
Line 7, change "comma-delineated" to -- comma delimited --.

Column 10,
Line 38, change "product s" to -- product's --.

Column 11,
Line 34, change "dimnensional" to -- dimensional --.

Signed and Sealed this

First Day of July, 2003

JAMES E. ROGAN
*Director of the United States Patent and Trademark Office*